United States Patent [19]

Nishii

[11] Patent Number: 4,534,270
[45] Date of Patent: Aug. 13, 1985

[54] VACUUM BOOSTER ASSEMBLY

[75] Inventor: Michiharu Nishii, Toyota, Japan

[73] Assignee: Aisin Seiki Kabushiki Kaisha, Kariya, Japan

[21] Appl. No.: 552,467

[22] Filed: Nov. 16, 1983

[30] Foreign Application Priority Data

Dec. 1, 1982 [JP] Japan .............. 57-182925[U]
Dec. 2, 1982 [JP] Japan .............. 57-182919[U]

[51] Int. Cl.³ .................. F01B 19/00; F16J 3/02
[52] U.S. Cl. .................. 91/376 R; 91/369 A; 92/98 D; 92/99
[58] Field of Search ............ 91/369 A, 369 B, 376 R, 91/369 R; 92/98 D, 99, 100, 98 R; 60/554

[56] References Cited

U.S. PATENT DOCUMENTS

| | | | |
|---|---|---|---|
| 4,257,312 | 3/1981 | Ohmi et al. | 92/99 |
| 4,296,680 | 10/1981 | Ohta et al. | 92/98 D |
| 4,345,506 | 8/1982 | Ohomi | 91/376 R |
| 4,347,779 | 9/1982 | Belart | 91/369 A |
| 4,348,944 | 9/1982 | Ochiai | 92/99 |
| 4,353,287 | 10/1982 | Weiler | 92/99 |
| 4,353,291 | 10/1982 | Hauduc | 92/99 |

FOREIGN PATENT DOCUMENTS 844426  7/1981  U.S.S.R. .............. 60/554

Primary Examiner—Paul E. Maslousky
Attorney, Agent, or Firm—Oblon, Fisher, Spivak, McClelland & Maier

[57] ABSTRACT

A vacuum booster assembly in which a diaphragm member is coupled over a piston body at its inner peripheral bead and secured to the inner wall of a housing of the booster assembly at its outer peripheral bead, and an annular support plate is attached to one face of the diaphragm member and has an inner cylindrical portion coupled with the inner peripheral bead of the diaphragm member to fasten the same to the piston body. The annular support plate is made of thin sheet metal and formed at its radially inward circumference with an annularly pressed portion, and an annular reinforcement plate of thick sheet metal is integrally secured to the annularly pressed portion of the support plate and has an inner cylindrical portion coupled with the inner cylindrical portion of the support plate.

5 Claims, 7 Drawing Figures

VACUUM BOOSTER ASSEMBLY

BACKGROUND OF THE INVENTION

The present invention relates to a vacuum booster assembly adapted for use in automobile brakes, and more particularly to a vacuum booster assembly of the type provided therein with a diaphragm piston assembly.

A conventional vacuum booster assembly of this type comprises a housing, a piston body axially movable in the housing, a diaphragm member having an inner peripheral bead coupled over the piston body and an outer peripheral bead secured to the inner wall of the housing, the diaphragm member being arranged to subdivide the interior of the housing into a negative pressure chamber and a variable pressure chamber, valve means cooperable with the piston body for selectively communicating the variable pressure chamber with the negative pressure chamber or atmospheric air, and an annular support plate attached to one face of the diaphragm member and having an inner cylindrical portion coupled with the inner cylindrical bead of the diaphragm member to fasten the same to the piston body in an air-tight manner.

In the above described booster assembly, the annular support plate is fixed only at its inner cylindrical portion to the piston body and is resiliently flexed in an axial direction when received a load caused by the difference in pressure between the negative and variable pressure chambers. On the other hand, it is desired to make the booster assembly as small in its axial width as possible and as light in weight as possible. For this reason, it is required to make the annular support plate as small in axial width as possible without causing undesired resilient flexure, and it is further required to make the annular support plate as light in weight as possible with sufficient strength against the load applied thereto.

Furthermore, in general, the housing consists of front and rear shells coupled at their peripheral rims to each other, and the outer peripheral bead of the diaphragm member is clamped in an air-tight manner at the coupled portion of the front and rear shells. FIG. 7 illustrates the coupled portion of the front and rear shells which are respectively designated by reference numerals 1 and 2. The rear shell 2 is formed at its outer peripheral rim with a radially outwardly folded annular edge 2a and an annular clamp flange 2b extending outwardly from the folded annular edge 2a. Thus, the outer peripheral bead 3a of the diaphragm member 3 is coupled within an annular groove C in the annular clamp flange 2b and clamped by engagement with the inner wall of the front shell 1. Meanwhile, the annular clamp flange 2b is coupled with an annular stepped flange 1a of the front shell 1 which is radially inwardly bent at its circumferentially spaced positions to fasten the annular clamp flange 2b in place. In such a conventional construction, the folded annular edge 2a is formed with an annular slit S which opens outwardly to allow entry of the water therein. This results in corrosion of the annular clamp flange 2b in a short period of time. It is, therefore, required to thicken the rear shell 2 in order to ensure the durability of the annular clamp flange 2b.

SUMMARY OF THE INVENTION

It is, therefore, a primary object of the present invention to provide an improved vacuum booster assembly in which the annular support plate is made of thin sheet metal to make the booster assembly as small in its axial width as possible and as light in weight as possible, and in which an annular reinforcement plate of thick sheet metal is secured to the support plate to reinforce the inner cylindrical portion of the support plate thereby to ensure sufficient strength of the support plate against the load applied thereto.

Another object of the present invention is to provide an improved vacuum booster assembly capable of preventing corrosion at the clamped portion of the outer peripheral bead of the diaphragm member.

According to one aspect of the present invention there is provided a vacuum booster assembly wherein the annular support plate is made of thin sheet metal and formed at its radially inward circumference with an annularly pressed portion, and an annular reinforcement plate of thick sheet metal is integrally secured to the annularly pressed portion of the support plate and has an inner cylindrical portion coupled with the inner cylindrical portion of the support plate.

According to another aspect of the present invention there is provided a vacuum booster assembly the housing of which comprises a first shell having an annular opening portion formed with an annular stepped flange, and a second shell having an outer peripheral rim coupled within the annular opening portion of the first shell, the outer peripheral rim being formed with a radially inwardly folded annular edge and an annular clamp flange extending axially inwardly from the folded annular edge, and wherein the outer peripheral bead of a diaphragm member is coupled within the annular clamp flange of the second shell and clamped in place by engagement with the inner wall of the first shell, and the folded annular edge of the second shell is coupled within the annular stepped flange of the first shell and fastened in place by a radially inwardly bent portion of the annular stepped flange.

BRIEF DESCRIPTION OF THE DRAWINGS

Additional objects and advantages of the present invention will be more readily apparent from the following detailed description of preferred embodiments thereof when taken together with the accompanying drawings, in which.

DETAILED DESCRIPTION OF THE PREFERRED EMBODIMENTS

Figure 1:
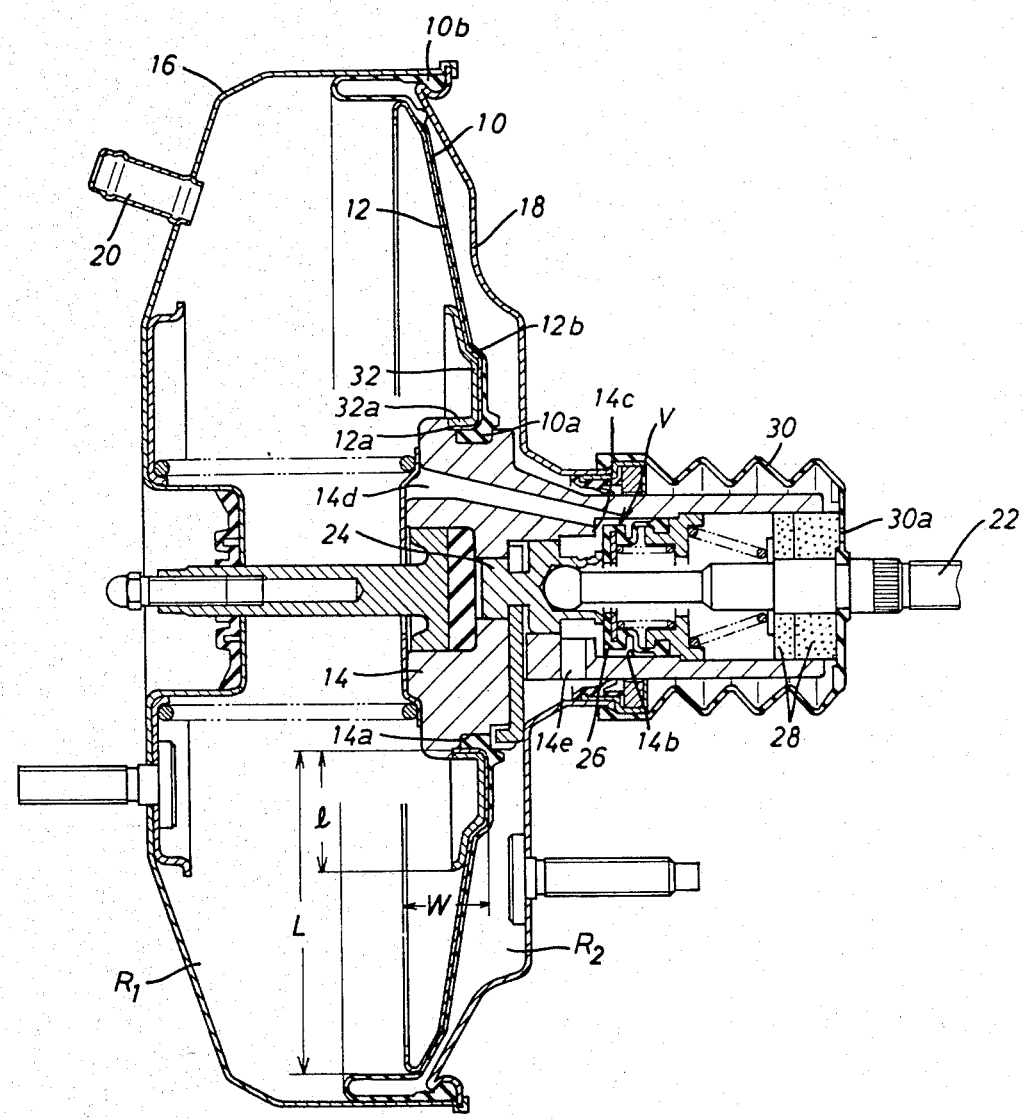
FIG. 1 illustrates an elevational section of a first embodiment of a vacuum booster assembly in accordance with the present invention.

In FIG. 1 of the drawings there is illustrated a first embodiment of a vacuum brake booster assembly in accordance with the present invention, in which a diaphragm member 10 has an inner peripheral bead 10a coupled over an annular stepped portion 14a of a piston body 14 and an outer peripheral bead 10b clamped by outer peripheral rims of front and rear housing shells 16 and 18 in an air-tight manner, and in which an annular support plate 12 is attached to one face of diaphragm member 10 and has an inner cylindrical portion 12a coupled over the inner peripheral bead 10a of diaphragm member 10 to secure the same in place to the piston body 14 in an air-tight manner. Thus, the interior of front and rear housing shells 16 and 18 is subdivided by the diaphragm member 10 into a negative pressure chamber $R_1$ and a variable pressure chamber $R_2$. A port 20 is provided on front shell 16 to communicate therethrough the negative pressure chamber with a vacuum source (not shown), while a valve assembly V is arranged in a cylindrical portion of piston body 14 to selectively communicate therethrough the variable pressure chamber $R_2$ with the negative pressure chamber $R_1$ or the atmospheric air. The valve assembly V comprises a valve plunger 24 and a spring loaded valve member 26 which are coaxially movable in the cylindrical portion of piston body 14. The valve plunger 24 is axially movable in piston body 14 and connected to the inner end of a push rod 22 to be moved inwardly by a brake pedal (not shown). The valve member 26 is arranged within a stepped bore 14b in piston body 14 in such a way to be separated from an annular shoulder 14c in bore 14 by engagement with the valve plunger 24 when the push rod 22 is in its inoperative position. Thus, the variable pressure chamber $R_2$ normally communicates with the negative pressure chamber $R_1$ through a passage 14d in piston body 14, the bore 14b, and a radial passage 14e in piston body 14. When the push rod 22 is moved inwardly by depression of the brake pedal, the valve member 26 is brought into engagement with the annular shoulder 14c in bore 14b and separated from the valve plunger 24 to communicate the variable pressure chamber $R_2$ with the atmospheric air through the radial passage 14e, the bore 14b, a bore in valve member 26, an air filter 28 and a vent hole 30a in a sealing bore 30.

In the above embodiment, the annular support plate 12 is made of thin sheet metal and formed at its radially inward circumference with an annularly pressed portion 12b, and an annular reinforcement plate 32 of thick sheet metal is adhered or welded to the annularly pressed portion 12b of support plate 12, the thickness of reinforcement plate 32 being approximately two times that of support plate 12. The reinforcement plate 32 has an inner cylindrical portion 32a coupled over the inner cylindrical portion 12a of support plate 12 and extends radially outwardly in a predetermined radius l over the annularly pressed portion 12b of support plate 12. The predetermined radius l is determined to be less than half the radius L of support plate 12. The other construction is substantially the same as that in a conventional brake booster assembly of this kind.

In the brake booster assembly described above, the support plate 12 of thin sheet metal serves to make the diaphragm piston assembly as small in its axial width as possible and to make the same as light in weight as possible, and the annularly pressed portion 12b of support plate 12 serves to enhance the rigidity of the diaphragm piston assembly. Furthermore, the reinforcement plate 32 serves to receive the load acting on the support plate 12 caused by the difference in pressure between chambers $R_1$ and $R_2$ and to enhance the durability at the inner cylindrical portion 12a of support plate 12. As result, the whole construction of the brake booster assembly can be made as small in size as possible and as light in weight as possible. It is further noted that the reinforcement plate 32 is coupled at its inner cylindrical portion 32a with the inner cylindrical portion 12a of support plate 12 to enhance the mounting strength at the inner peripheral bead 10a of diaphragm member 10 and to ensure the sealing effect between the diaphragm member 10 and the piston body 14.

Figure 2:
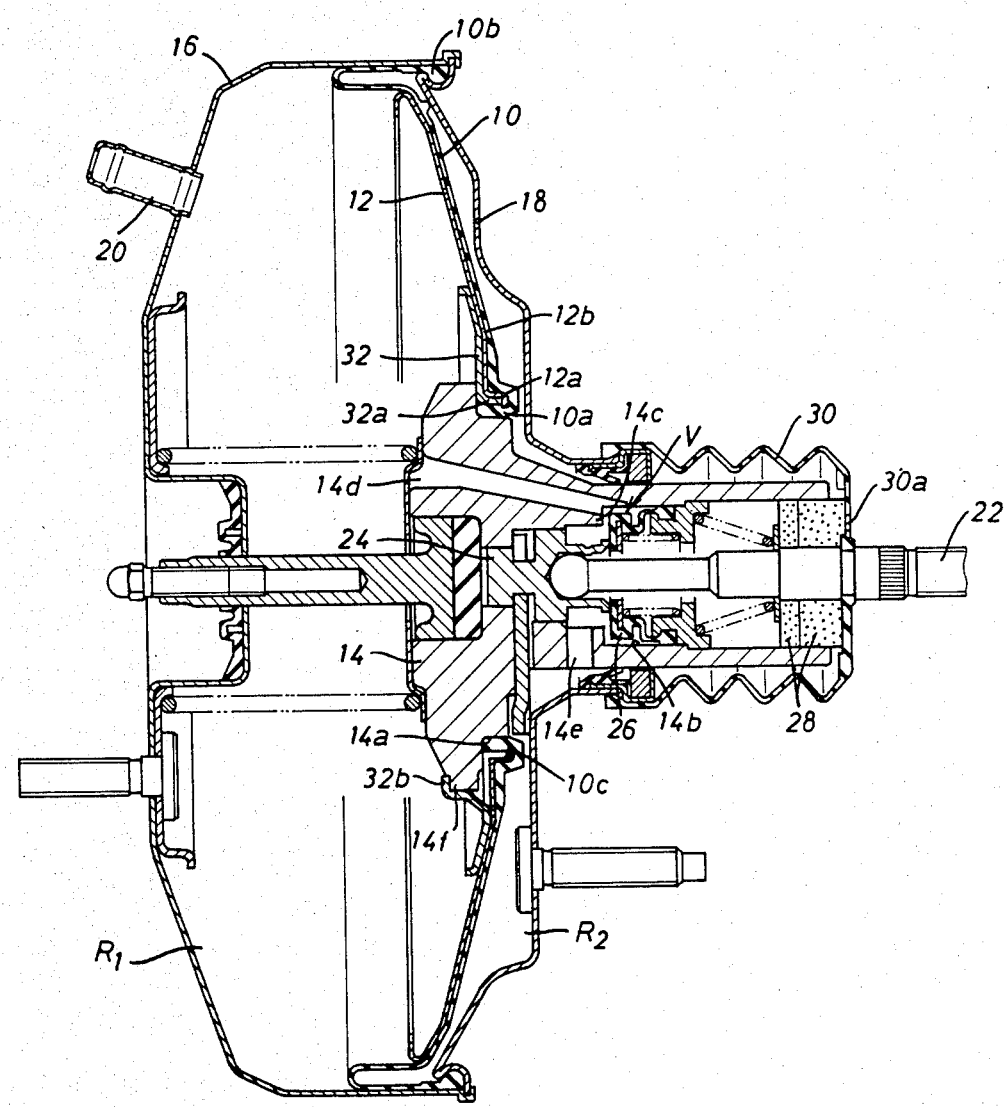
FIG. 2 illustrates an elevational section of a second embodiment of a vacuum booster assembly in accordance with the present invention.

In FIG. 2 there is illustrated a second embodiment of the brake booster assembly, in which the inner cylindrical portion 12a of support plate 12 is coupled over the inner cylindrical portion 32a of reinforcement plate 32 and inserted with the same into an annular groove 10c in the inner peripheral bead 10a of diaphragm member 10 such that the inner bead 10a of diaphragm member 10 is coupled over the annular stepped portion 14a of piston body 14 with a press fit and fixed in place. Furthermore, the reinforcement plate 32 is formed at its inner cylindrical portion 32a with a plurality of circumferentially spaced claws 32b which are hooked on a shoulder 14f of piston body 14 to fasten the support plate 12 in place.

Figure 3:
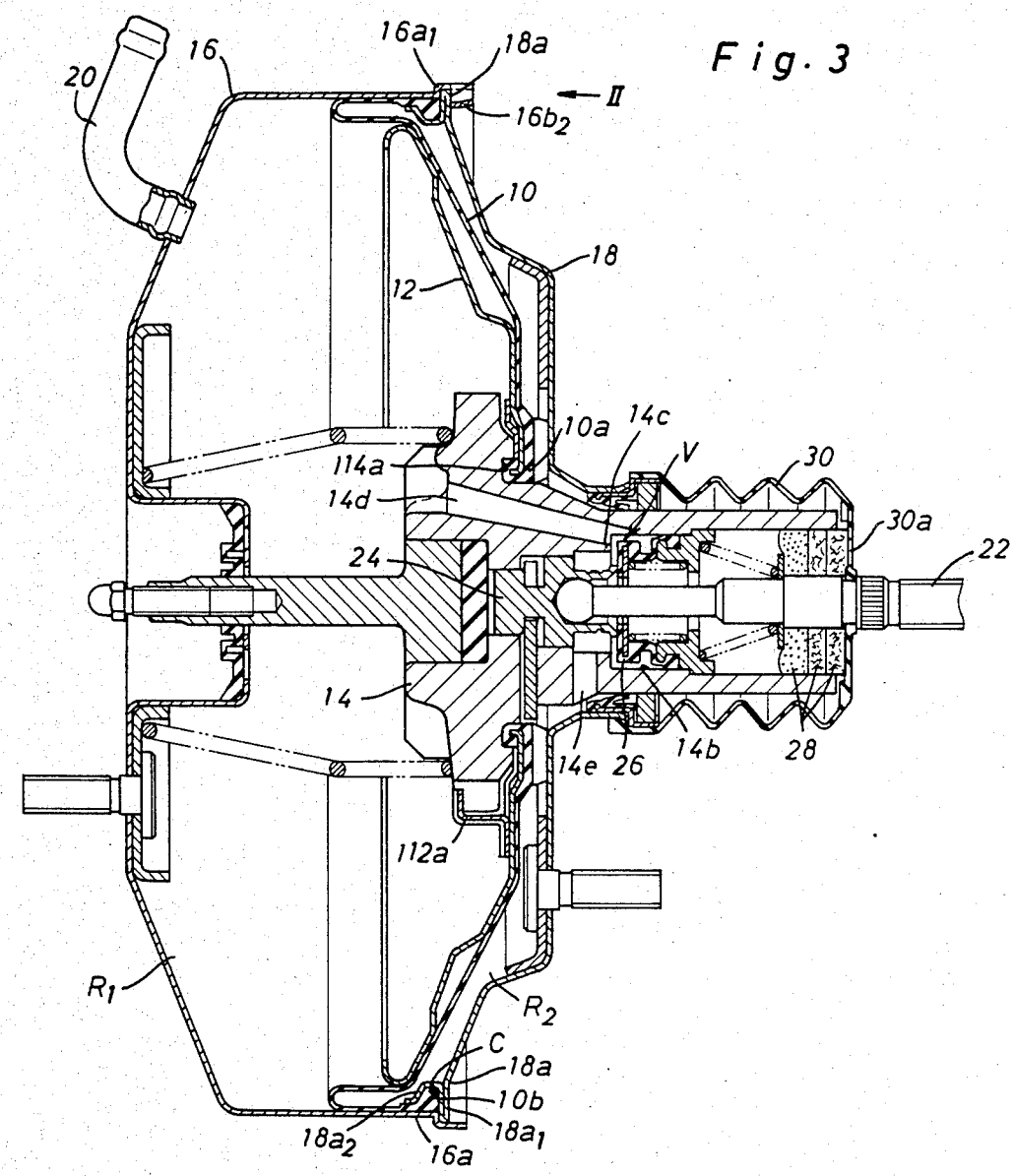
FIG. 3 illustrates an elevational section of another embodiment of a vacuum booster assembly in accordance with the present invention.
Figure 4:
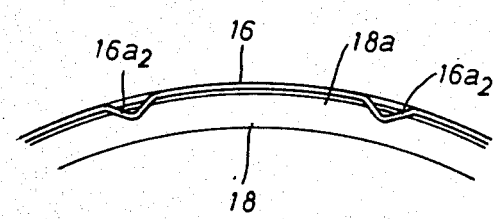
FIG. 4 is a rear view of a portion shown by the reference arrow II in FIG. 3.

In FIG. 3 there is illustrated another embodiment of the brake booster assembly, in which the support plate 12 is embedded at its inner peripheral rim in the inner peripheral bead 10a of diaphragm member 10 and fastened to a shoulder of piston body 14 by means of a fastening member 112a secured thereto and in which the inner bead 10a of diaphragm member 10 is coupled in an air-tight manner within an annular groove 114a in piston body 14. In this embodiment, the rear shell 18 is formed at its outer peripheral rim 18a with a radially inwardly folded annular edge 18a₁ and an annular clamp flange 18a₂ extending axially inwardly from the folded annular edge 18a₁ toward the interior of the front housing shell 16. Thus, the outer peripheral bead 10b of diaphragm member 10 is coupled within an annular groove C in the annular clamp flange 18a₂ of shell 18 and clamped in an air-tight manner by engagement with the inner wall of an opening portion 16a of front shell 16. During such clamping process of the outer bead 10b of diaphragm member 10, the radially inwardly folded annular edge 18a₁ of shell 18 is coupled within an annular stepped flange 16a₁ which is formed at the opening portion 16a of front shell 16 and is radially inwardly bent by pressing at its circumferentially spaced positions 16a₂ to fasten the folded annular edge 18a₁ of shell 18 in place, as shown in FIGS. 3 and 4.

Figure 5:
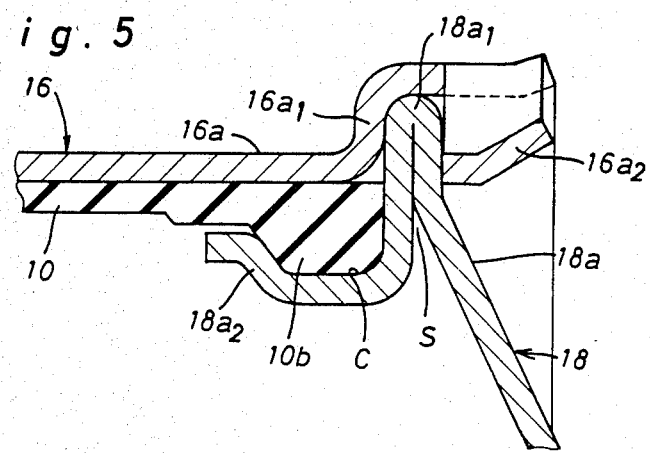
FIG. 5 is an enlarged part-sectional view of a coupled portion of front and rear shells in the booster assembly of FIG. 3.
Figure 6:
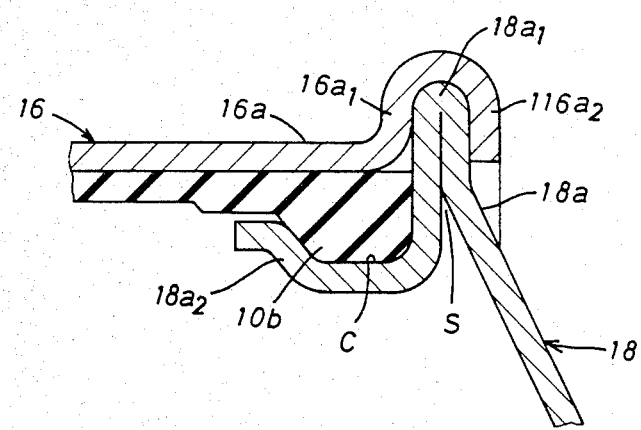
FIG. 6 is an enlarged part-sectional view showing a modification of the coupled portion of the front and rear shells.
Figure 7:
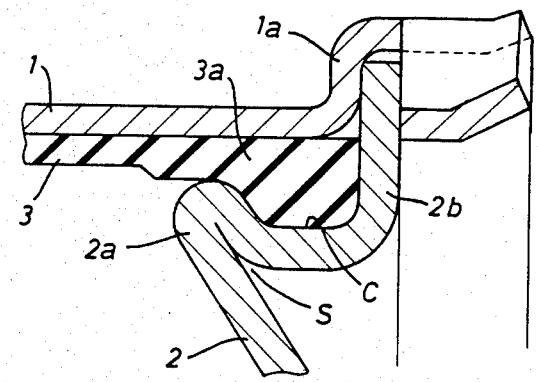
FIG. 7 is an enlarged part-sectional view of a coupled portion of front and rear shells in a conventional booster assembly.

At the coupled portion of front and rear shells 16 and 18, it is to be noted that as can be well seen in FIG. 5, the radially inwardly folded annular edge 18a₁ of shell 18 is engaged with the inner wall of annular stepped flange 16a₁ of shell 16 to enhance the strength at the coupled portion of shells 16 and 18 and is arranged to form in a simple construction the annular clamp flange 18a₂ without provision of any other folded portion. It is also noted that an annular slit S formed in the annular edge 18a₁ opens toward the interior of the coupled shells 16 and 18 to avoid entry of the water therein. As a result, the rear housing shell 18 can be formed of thin sheet metal to be as light in weight as possible. In FIG. 6 there is illustrated a modification of the above embodiment in which the annular stepped flange $16a_1$ of shell 16 is radially inwardly bent by pressing at its whole periphery $116a_2$ to fasten the folded annular edge $18a_1$ of shell 18 thereto.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A vacuum booster assembly, comprising:
    a housing,
    a piston body axially movable in said housing,
    a diaphragm member having an inner peripheral bead coupled over said piston body and an outer peripheral bead secured to the inner wall of said housing, said diaphragm member being arranged to subdivide the interior of said housing into a negative pressure chamber and a variable pressure chamber,
    valve means cooperable with said piston body for selectively communicating said variable pressure chamber with said negative pressure chamber or the atmospheric air,
    an annular support plate attached to one face of said diaphragm member in said negative pressure chamber and having an inner cylindrical portion coupled with the inner peripheral bead of said diaphragm member to fasten the same to said piston body in an air-tight manner, wherein said annular support plate is made of thin sheet metal and formed at its radially inward circumference with an annularly pressed portion, and an annular reinforcement plate of thick sheet metal integrally secured to the annularly pressed portion of said support plate and located in said negative pressure chamber, said reinforcement plate being extended radially outwardly in a predetermined radius over the annularly pressed portion to prevent flexure of the outer peripheral portion of said support plate.

2. A vacuum booster assembly as claimed in claim 1, wherein the radius of said reinforcement plate is less than half that of said support plate.

3. A vacuum booster assembly as claimed in claim 1, wherein the inner cylindrical portion of said support plate is coupled over the inner peripheral bead of said diaphragm member, and said reinforcement plate has an inner cylindrical portion coupled over the inner cylindrical portion of said support plate.

4. A vacuum booster assembly as claimed in claim 1, wherein said reinforcement plate has an inner cylindrical portion, and wherein the inner cylindrical portion of said support plate is coupled over the inner cylindrical portion of said reinforcement plate and inserted with the same into an annular groove in the inner peripheral bead of said diaphragm member.

5. A vacuum booster assembly as claimed in claim 1, wherein the thickness of reinforcement plate is substantially two times that of said support plate.

* * * * *